United States Patent
Dusenberry

(10) Patent No.: US 10,945,204 B2
(45) Date of Patent: Mar. 9, 2021

(54) BATTERY POWER MANAGEMENT FOR A CELLULAR DEVICE

(71) Applicant: Itron, Inc., Liberty Lake, WA (US)

(72) Inventor: Robert Vernon Dusenberry, Liberty Lake, WA (US)

(73) Assignee: Itron, Inc., Liberty Lake, WA (US)

( * ) Notice: Subject to any disclaimer, the term of this patent is extended or adjusted under 35 U.S.C. 154(b) by 136 days.

(21) Appl. No.: 16/237,233

(22) Filed: Dec. 31, 2018

(65) Prior Publication Data

US 2020/0112916 A1  Apr. 9, 2020

Related U.S. Application Data

(60) Provisional application No. 62/742,154, filed on Oct. 5, 2018.

(51) Int. Cl.
*H04W 52/02* (2009.01)
*H04W 72/12* (2009.01)

(52) U.S. Cl.
CPC ... *H04W 52/0216* (2013.01); *H04W 52/0274* (2013.01); *H04W 72/1289* (2013.01)

(58) Field of Classification Search
None
See application file for complete search history.

(56) References Cited

U.S. PATENT DOCUMENTS

| | | |
|---|---|---|
| 6,678,538 B1 | 1/2004 | Koizumi |
| 9,929,772 B2 | 3/2018 | Rose et al. |
| 10,085,275 B2 | 9/2018 | Elsayed et al. |
| 2009/0149127 A1 | 6/2009 | Viitamaki et al. |

(Continued)

FOREIGN PATENT DOCUMENTS

| | | |
|---|---|---|
| EP | 2996406 A1 | 3/2016 |
| EP | 2973933 B1 | 10/2017 |

(Continued)

OTHER PUBLICATIONS

Invitation to Pay Additional Fees dated Dec. 10, 2019 for PCT Application No. PCT/US2019/054861, "Battery Power Management for a Cellular Device", 11 pages.

(Continued)

*Primary Examiner* — Andrew C Oh
(74) *Attorney, Agent, or Firm* — Lee & Hayes, P.C.

(57) ABSTRACT

Techniques for operating cellular internet of things (IoT) devices under a public cellular carrier are disclosed. During an active connection, the cellular IoT device's radio-controlling application can collect radio metrics by tapping into the diagnostics interface of IoT device's cellular modem to collect data regarding accumulative signal strength, block/bit error rate, and/or round-trip latency for the session, etc. During the active connection, battery and environmental information as well as application-based information can be collected and sent to a remote computing device. In an example, the cellular IoT device can be given revised or refined values for use in timers, which may be used by the device to more efficiently use idle and/or power-save modes to reduce battery power consumption. Moreover, the use of the timers may be extended to devices distinct from the cellular modem, thereby increasing the utility of the timers and the functionality of the IoT device.

20 Claims, 7 Drawing Sheets

(56) References Cited

U.S. PATENT DOCUMENTS

| | | | |
|---|---|---|---|
| 2013/0182625 A1 | 7/2013 | Kuehnel et al. | |
| 2013/0331081 A1 | 12/2013 | Rune et al. | |
| 2014/0024416 A1 | 1/2014 | Xie et al. | |
| 2017/0061920 A1 | 3/2017 | Dey et al. | |
| 2017/0093540 A1* | 3/2017 | Lei | H04L 27/266 |
| 2017/0135052 A1* | 5/2017 | Lei | H04J 13/0062 |
| 2018/0084505 A1 | 3/2018 | Guillen | |
| 2018/0124544 A1* | 5/2018 | Gupta | H04W 4/18 |
| 2018/0139697 A1 | 5/2018 | Kim et al. | |
| 2018/0152889 A1* | 5/2018 | Kim | G06F 21/44 |
| 2018/0295583 A1 | 10/2018 | Cornwall et al. | |
| 2019/0342722 A1* | 11/2019 | Lee | H04W 16/26 |
| 2019/0364508 A1 | 11/2019 | Cornwall et al. | |
| 2020/0100088 A1* | 3/2020 | Kim | H04W 88/04 |
| 2020/0107237 A1* | 4/2020 | Mangalvedhe | H04W 48/20 |
| 2020/0112915 A1 | 4/2020 | Dusenberry et al. | |
| 2020/0120478 A1* | 4/2020 | Kim | H04W 8/245 |
| 2020/0267670 A1* | 8/2020 | strom | H04W 48/10 |

FOREIGN PATENT DOCUMENTS

| | | |
|---|---|---|
| GB | 2549793 A | 11/2017 |
| WO | WO2008086231 | 7/2008 |
| WO | WO2012142657 | 10/2012 |
| WO | WO2016122394 | 8/2016 |
| WO | WO2016140969 | 9/2016 |
| WO | WO2018086062 | 5/2018 |

OTHER PUBLICATIONS

PCT Search Report and Written Opinion dated Jan. 7, 2020, for PCT Application No. PCT/US2019/054865, 14 pages.

Non-Final Office Action dated Nov. 20, 2018 for U.S. Appl. No. 15/480,965 "Device and Battery Management in a Cellular Network" Cornwall, 10 pages.

Office action for U.S. Appl. No. 15/430,965, dated Jul. 18, 2018, Cornwall, "Device and Battery Management in a Cellular Network", 9 pages.

PCT Search Report and Written Opinion dated Jun. 5, 2018 for PCT application No. PCT/US2018/020550, 13 pages.

Power Saving Mode (PSM) in UEs, MME Administration Guide, StarOS Release 21, unknown release date, retrieved Oct. 1, 2018, 6 pages.

PCT Search Report and Written Opinion dated Apr. 2, 2020 for PCT Application No. PCT/US2019/054861, 14 pages.

* cited by examiner

BATTERY POWER MANAGEMENT FOR A CELLULAR DEVICE

RELAYED APPLICATIONS

This patent application claims priority to U.S. patent application Ser. No. 62/742,154, titled "Battery Power Management for a Cellular Device", filed on 5 Oct. 2018, commonly assigned herewith, and hereby incorporated by reference.

BACKGROUND

In the utility industry, gas meters and water meters are traditionally battery-powered. In many cases, ten- or twenty-year battery life is a design parameter. Unfortunately, after a meter is installed there is little that can be done to improve the battery life. Instead, the traditional focus is on replacing the battery before it fails. In an example, the operations performed by the battery-powered meter, such as radio transmissions that report consumer usages, are counted. Using the count, an end-of-life for the battery can be estimated, although the power used by each operation is not known, and the power used in such operations can vary widely. In the example, when the estimated battery end-of-life is less than a threshold level, the battery will be flagged for replacement.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
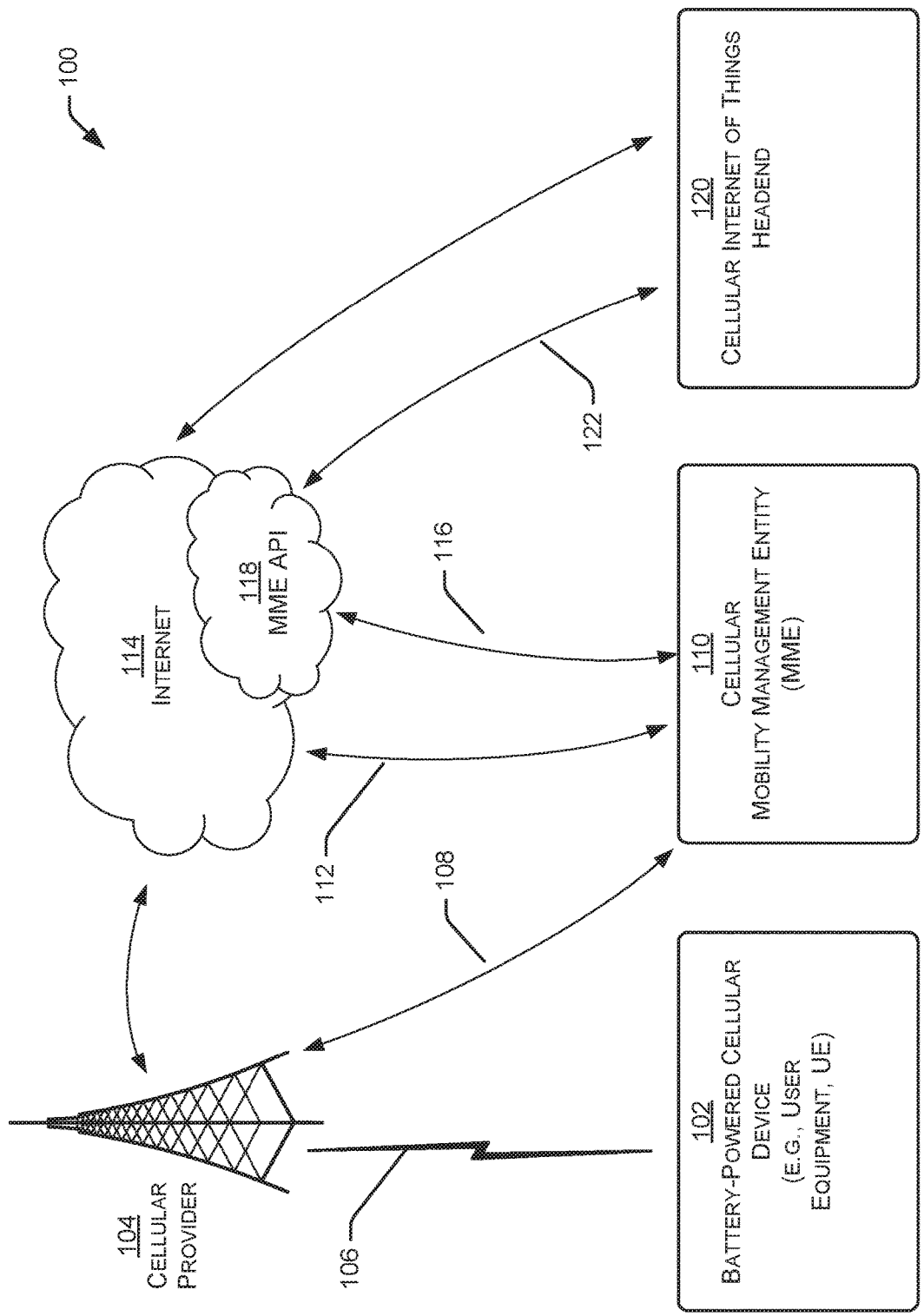
FIG. 1 is a block diagram showing an example system, wherein a battery-powered device operates within a cellular network.

Innovations discussed herein include the adaptation of cellular networks for use in data reporting by utility meters, and for other uses in the retail, warehousing, transportation and internet-of-things (IoT) related industries. Previously, the power required for operation of battery-powered devices on a cellular network has been too high for long-term use. In an example of why this is true, NB-IoT and LIE Cat-M1 Cellular IoT devices operating under a public carrier have limited knowledge of the overall system coverage since they are typically only able to measure the serving cell quality and coverage during an active connection. For a primary cell, battery-powered device, this is problematic since device coverage in both NB-IoT and LTE Cat-M1 is improved at the expense of latency, bandwidth, and spectral efficiency. If a battery-powered cellular device is located in a deep in-building or in a below-grade location, there may be a path loss of tens of dBs. Such a loss is inconsistent with minimizing repetition, such as redundant transmissions of the same frame, which are then combined at the receiving end. Every repetition increases the coverage by 3 dB, assuming ideal channel estimation and TX/RX chain. However, the latency may be doubled, and throughput and spectral efficiency may be reduced by half. As a result, the time required for a round trip communication may be increased by approximately 10 seconds, and throughput may be decreased to 100 bits per second. Such events will directly impact the load characteristic presented to the primary cell battery. Accordingly, there is a need for a system that will mitigate power expenditures and optimize battery life of an IoT device deployed in a fixed location within a cellular network.

The disclosure describes techniques for changing behavior of a network node (e.g., user equipment (UE) or a network endpoint) to result in longer battery life and/or more convenient battery replacement. An example illustrating some of the techniques discussed herein—not to be considered a full or comprehensive discussion—may assist the reader.

In the example, cellular IoT devices operating under a public carrier are typically only able to measure the serving cell quality and coverage during an active connection while for the vast majority of their operational duty cycle they are operating in a low-power and/or standby state wherein they are unable to collect metrics. During the active connection, the cellular IoT device's radio-controlling application can collect radio metrics by tapping into the diagnostics interface of the IoT cellular modem to collect data regarding accumulative signal strength, block/bit error rate, and/or round-trip latency for the session, etc. During the active connection, battery and environmental information as well as application-based information can be collected and sent to the headend, remote computing device and/or collection system. Using LTE-CatM1 and LTE-NB1, the operational model for this class of LPWA device is intended for fixed-location devices (as opposed to mobile cellular telephones). Additionally, a persisted context obviates the need for the device to update and/or perform its tracking area update (TAU), thus reducing active current requirements by reducing LTE signaling plane negotiations.

In the example, the cellular IoT device can utilize a power save mode (PSM), during which the user equipment (UE)— e.g., a cellular modem—remains registered with the network. Additionally, the UE may request from the network access to the values of two timers (T3324 and T3412). The two timers may be used by the UE to time, and to therefore anticipate, the next idle period and the next PSM period. Moreover, the use of the timers may be extended to devices distinct from the cellular modem, thereby increasing the utility of the timers and the functionality of the IoT device.

In a number of examples, reference is made to a power supply with multiple power levels, such as a lower-power level or mode, an intermediate-power level or mode, and/or a higher-power level or mode. In such cases, alternative examples are herein expressly made to the use of two or more power supplies. That is, while lower-power, intermediate-power and higher-power levels could be supplied by different modes of a single power supply, lower-power, intermediate-power and higher-power could alternatively be provided by a lower-power power supply, an intermediate-power power supply and a higher-power power supply, respectively. And still further, the intermediate-power level and the higher-power level could be provided by different modes of a first power supply, while the lower-power level could be provided by a second power supply.

Example System and Techniques

FIG. 1 shows an example system 100, wherein a battery-powered cellular device 102 operates within a cellular network of a cellular provider 104. In the example, the battery-powered device 102 may be a utility metering device (e.g., a water or gas meter), or any device from the internet of things (IoT). The battery-powered device 102 may be considered to be "user equipment," (UE), in that from the point of view of the cellular provider 104, the battery-powered device 102 may be equipment belonging to a customer or "user." Accordingly, water meters, gas meters, products for sale within stores, a person's car keys, wallet, purse or literally anything can potentially be connected to a network as part of the IoT. Once part of that network, the UE 102 communicates by radio frequency signal 106 with the cellular provider 104, and provides information to any computing device, such as a headend computing device.

In some systems, cellular IoT devices operating under a public carrier may be limited to measurement of the serving cell quality and coverage data during an active connection. During this active connection, the cellular IoT device's application can collect radio metrics by tapping into the diagnostics interface of the IoT modem to collect accumulative signal strength, block/bit error rate and round-trip latency for the session. During the active connection, battery and environmental information as well as application-based information can be collected and sent to the headend or collection system. However, for the vast majority of their operational duty cycle they are operating in a low power or standby state unable to collect any metrics.

In such systems, an approach to battery power management for a cellular device (e.g., the UE 102) may be limited to controlling the physical aspects of the cellular connection. The UE, if registered under a public cellular provider and/or carrier, can collect radio metrics by tapping into the diagnostics interface of a cellular modem of the UE. The metrics that can be collected include accumulative receive signal strength, block/bit error rate, and round-trip latency for the session. During the active connection, battery and environmental information as well as application-based information can be collected and weighted against remaining battery capacity if adequate battery fuel gauging is available. This approach may not account for signaling plane characteristics that take place between the LTE mobility management entity (MME) (i.e. the cellular tower) and the UE.

Other systems may account for such signaling plane characteristics. In such systems, the UE may use information including the maximum coupling loss (MCL) associated with communications between the UE 102 and cellular tower 104. The MCL is a common measure that describes the amount of coverage a cellular system can support. Availability an appropriate MCL value will allow the UE 102 to understand, and/or be provided with, the effective data rates and signaling modes employed in its communication sessions.

In order for the UE to understand MCL, key performances indicators may be evaluated by, and/or provided to, the UE which are not all available through local modem (i.e., the cellular modem of the UE) interrogation. For the UE to understand MCL, a calculation may be performed based on inputs, such as MME PA Power, receiver noise figure (NF), occupied channel bandwidth and required signal to noise ratio (SNR). Several of these inputs, or calculated results based on the input, may be provided to the UE. In an example, the MME 110 may provide the MCL and/or other data to the headend computer 120. (Alternatively, the MME and the headend computer may be merged into a single device, having the functionality of both.) Using the provided data, the headend computer may perform calculations, and provide the UE with resultant data, such as timer values, that the UE needs and/or can benefit from to extend battery life of the UE.

Systems may be configured for fixed-location UE (e.g., utility meters) and persisted context. In an example, the commercial availability of LIE-CatM1 and LTE-NB1 provides for an operational model including a class of LPWA devices having fixed-location and persisted-context such that devices are not required to update their tracking area update (TAU). This freedom reduces active current (and battery use) requirements by reducing LTE signaling plane negotiations. Using these technologies, the cellular IoT device can use PSM mode and remain registered with the network. In an implementation, the UE may request and/or receive from the network values for two timers (e.g., the T3324 and T3412 timers) for use in timing an idle and a power save mode (PSM) period, respectively.

In an example system, the T3324 and T3412 timers as well as a hyper frame sleep period (e.g., for use with extended discontinuous reception) may be configured in such a way as to maximize remaining battery capacity based on system coverage (e.g., MCL) and overall design requirements, case rules and limits. The UE may maintain original manufactured and/or default values for the timers. However, for optimal performance, re-calculated timer values and/or hyper frame values, may be provided to each UE by the cellular IoT headend, the mobility management entity (MME) and/or cellular tower or other computing device as part of the data interrogation and/or cellular network service.

FIG. 1 shows an internet or dedicated connection 108 between the cellular network 104 and the mobility management entity (MME) 110. The MME 110 may be in communication 112 with the internet 114. The MME 110 may also provide, and communicate 116 with, an MME applications programming interface (API) 118. The MME API 118 allows the headend computing device 120 to obtain values, e.g., MCL, timer values, hyper frame values, etc., associated with one or more UE 102. In one example, the MME API 118 may be used to send revised timer and other values to each of a plurality of UE.

The headend 120 is representative of a plurality of computing devices, such as a remote computer, networked computer, head office, computer, data collector, etc., that may access the MME API 118. Such computers may access the MME API 118 to obtain MCL values, timer values, hyper frame values, and/or other values, etc., for use in making calculations and/or for transmission to one or more UE devices 102. In an example, a headend device 120 obtains the MCL value (and/or other data) for a particular UE from the MME API 118, and calculates values such as timer values (and hyper frame values, if the UE is operating in an eDRX mode) for transmission to, and use by, the particular UE.

Accordingly, the MME API 118 may also be accessed by computers needing information such as the MCL of a UE. The MME API 118 may alternatively or additionally provide calculated values derived from information (e.g., the MCL of a UE), such as timer values and hyper frame values. Accordingly, while shown separately, the MME 110 and headend 120 could be merged into a single device.

Figure 2:
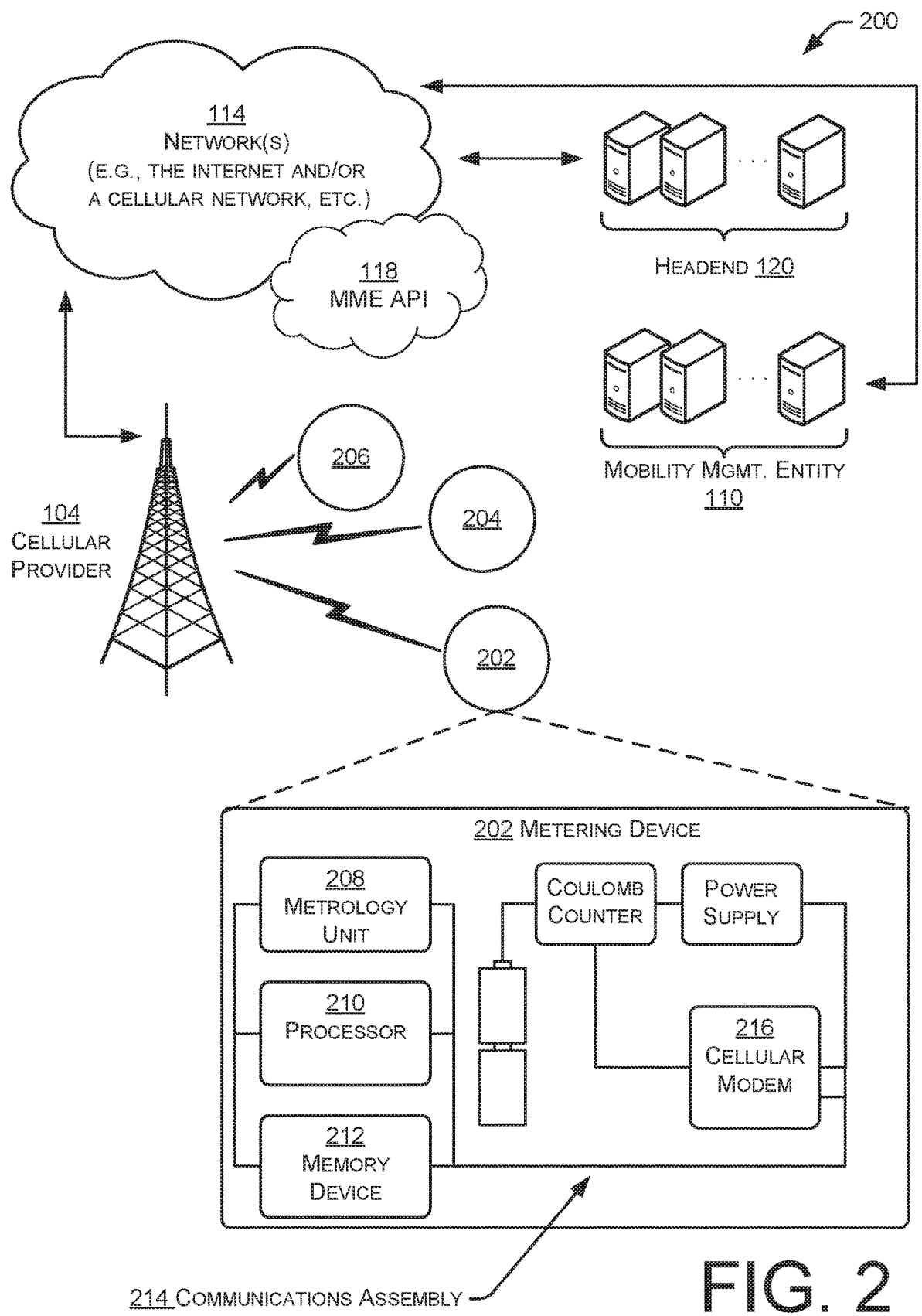
FIG. 2 is a block diagram showing an example system, wherein a battery-powered metering device operates within a cellular network.

FIG. 2 shows an example system 200, wherein battery-powered metering devices 202, 204, 206 operate within a cellular network of cellular provider 104. A metering device 202 is in cellular communication with the cellular provider 104. The cellular provider 104 allows the MME 110 to publish data in the MME API 118 that can be accessed by the headend 120, which supports the metering device 202 with timer values and/or hyper frame values that allow the metering device 202 to operate while using less battery power.

In the example, the metering device had a metrology unit 208, that may measure water, gas or other consumable resource. A processor 210 and memory 212 may direct operation of the metrology unit 208, and transfer and store data generated by the metrology unit. A communications assembly 214 may include a cellular modem 216, and one or more peripheral devices, such as external timers and logic devices that manage signals.

Figure 3:
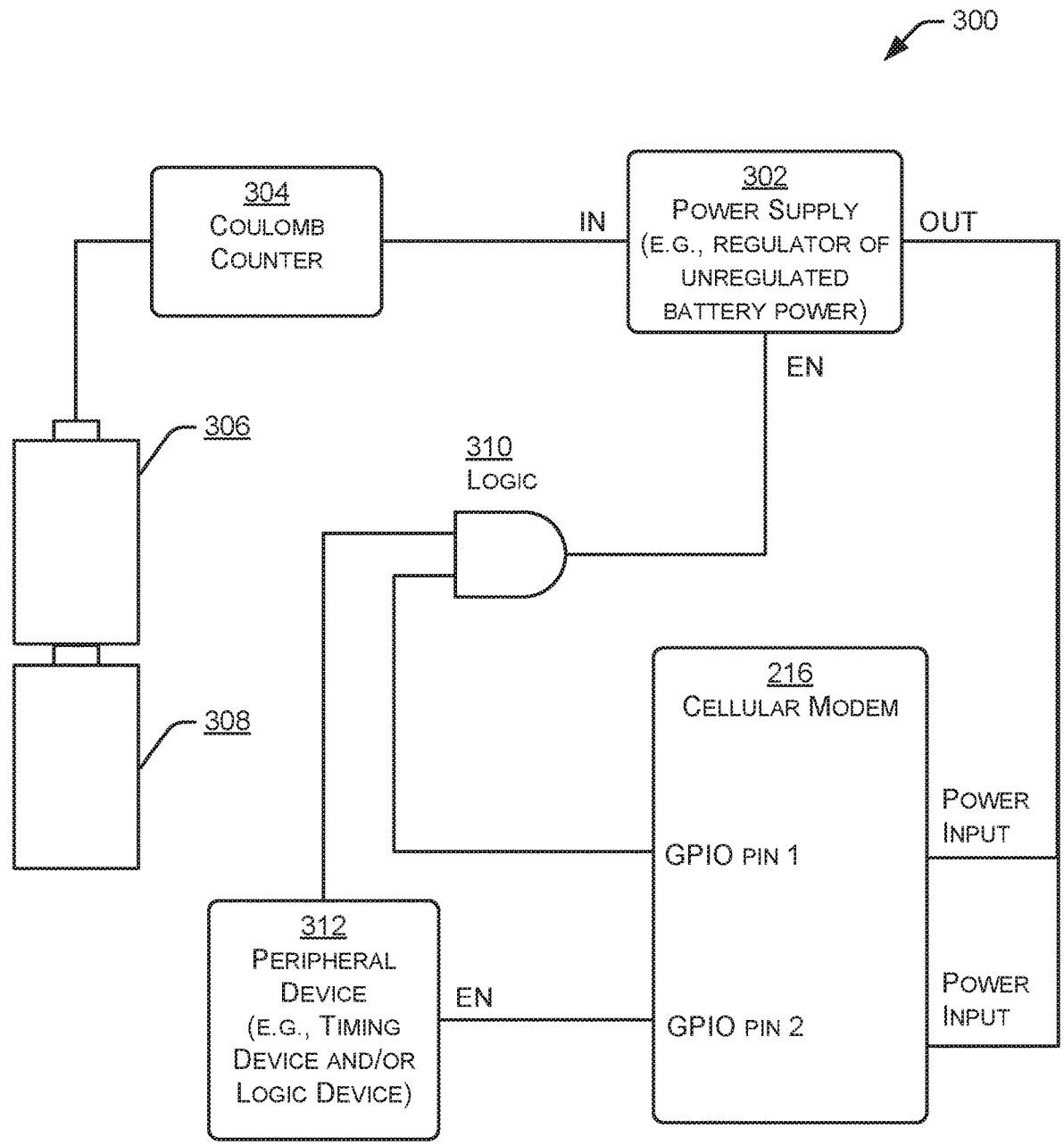
FIG. 3 is a block diagram showing an example configuration of a cellular modem within a battery-powered device.

FIG. 3 shows an example configuration of a cellular modem 216 within a battery-powered device 300. In the example, the cellular modem 216 receives power from a power supply or power regulator 302, which receives unregulated power through a Coulomb counter 304 from batteries 306, 308. The voltage is regulated at desired levels for different current requirements. As an example, different current requirements are associated with the cellular modem 216 in sleep, idle, RF receive and RF transmit modes. The cellular modem 216 may have one or more internal timers, which may be set according to an associated value(s) that determines the timed period. In addition to controlling the operation of sleep, idle, RX receive and RX transmit periods within the cellular modem 216, the timers may also be used to control functions of peripheral devices, such as the power supply 302.

In examples, the timers may control a "boot up" function of the cellular modem, the tracking area update (TAU) function, RF transmit, RF receive, idle periods, sleep (PSM) periods, hyper frame timing in eDRX, and other functionality. The timers may control devices external to the cellular modem 216, such as the power supply 302, such as by signals sent on the GPIO pins. Such signals may be fed through logical devices (e.g., representative gate 310), depending on design requirements. One or more peripheral devices 312 may be external to the cellular modem. Examples of external devices may include external timers, logic devices, and power supplies intended for various higher-power and lower-power requirements, etc.

Example Timing and Diagrams

Figure 4:
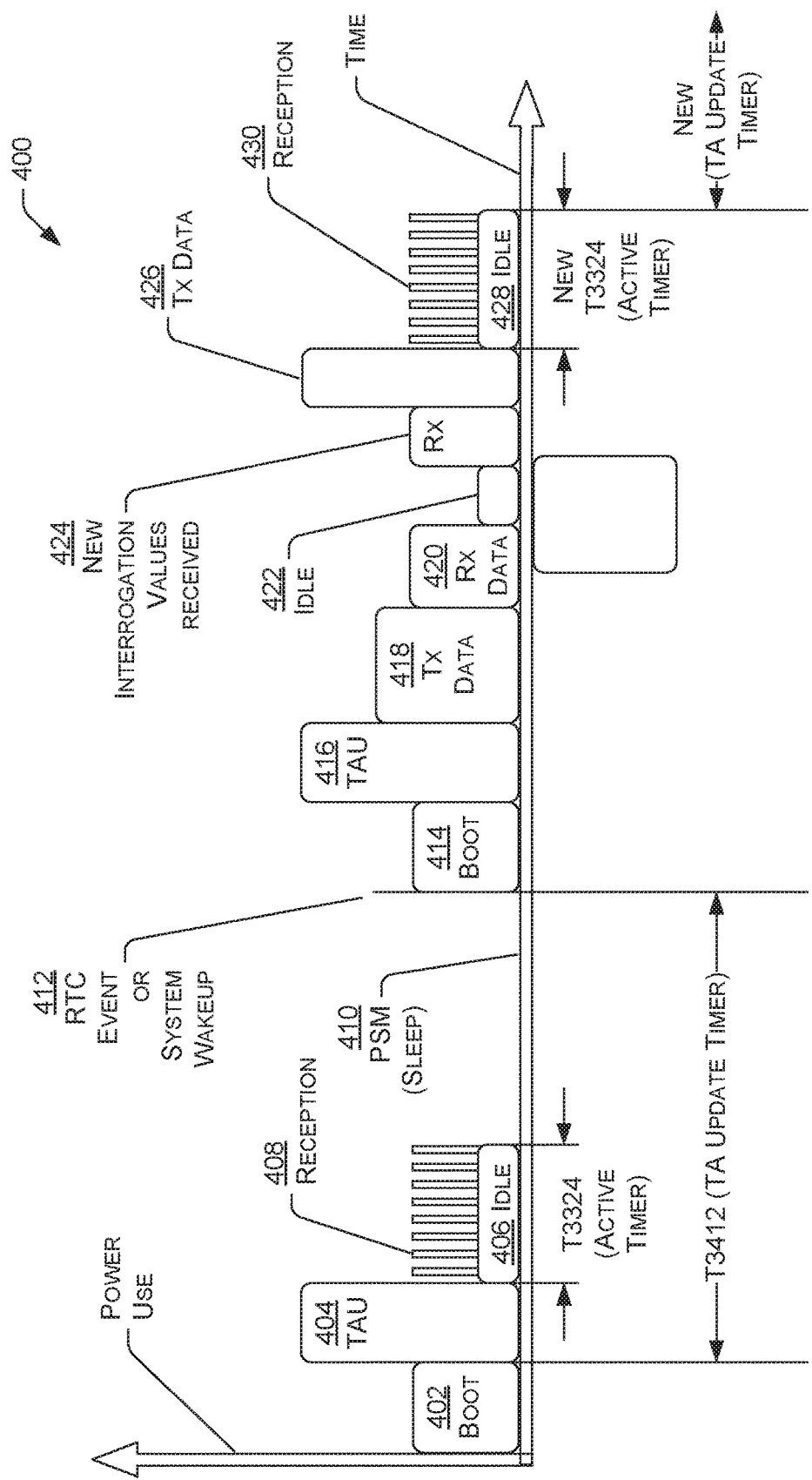
FIG. 4 is a timing diagram, showing example timing of radio frequency (RF) transmissions and receptions, idle periods and sleep periods within user equipment (e.g., an internet of things device).

FIG. 4 is a timing diagram 400, showing example timing of radio frequency (RF) transmissions and receptions, idle periods and sleep periods within user equipment (e.g., an internet of things device). The vertical axis shows power use, while the horizontal axis shows time. At 402, the UE boots up. At the conclusion of the boot-up process, a T3412 timer is started, which will kick off the next boot-up period, at the conclusion of a sleep period. At block 404, a tracking area update (TAU) may be performed. However, in a fixed device environment, the TAU may result in reception of no data. At block 406 an idle period is started, which is timed by the T3324 timer. The idle period uses more power than the PSM periods, but uses less power than the Tx and Rx periods. During the idle period the T3324 timer periodically kicks off periods 408 wherein the receiver is active, checking for a signal from the headend, via the cell tower. At 410, power save mode (PSM) utilizes very low power. At block 412, the T3412 timer signals an end to the PSM (sleep) period, and at block 414 a boot-up period is started, followed by a TAU period 416. At block 418 a transmission period turns on the transmitter, which sends data. In an example, the data may be consumption data sent to a headend or other computer. At block 420, a reception period turns on the receiver of the cellular modem. At block 422, the cellular modem idles. At block 424, the receiver of the cellular modem turns on, and new interrogation values, e.g., values for one or more timers, are received. At block 426, the cellular modem transmits data and/or an acknowledgement of the received interrogation values. At block 428, another idle period is started, including brief periods 430 where the receiver is activated to check for messages. The idle period 428 is timed by the T3324 timer. At the conclusion of the idle period 428, a new sleep period is started, according to the newly updated T3412 timer.

Figure 5:
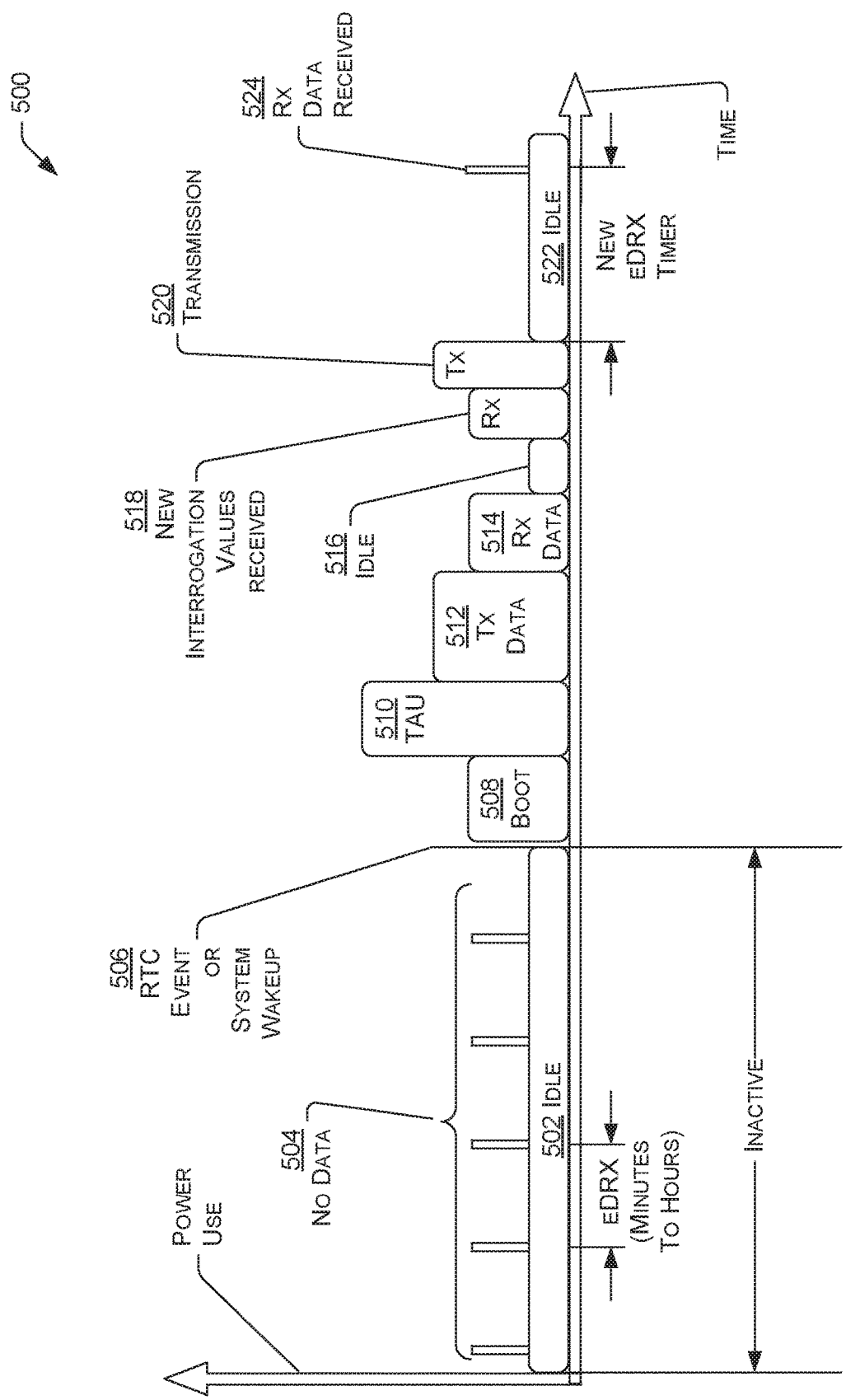
FIG. 5 is a timing diagram, showing example extended discontinuous reception within an internet of things device.

FIG. 5 is a timing diagram 500, showing example extended discontinuous reception (eDRX) within a battery-powered device. At block 502 an idle period is timed by a T324 timer. Within the idle period a region 504 includes several Rx periods in which no data is received. The length of the timers may be governed by a number of hyper frames, which can extend from minutes to hours. At event 506, the an RTC event or system wake-up is received. This results in a reboot 508, and at block 510 a TAU period. At block 512, the transmitter of the cellular modem is activated, and at block 514 the receiver is activated. At block 516, the cellular modem idles. At block 518, the receiver is activated and receives new interrogation values, which may include new values for the timer. At block 520, the transmitter of the cellular modem is activated. At block 522 at idle period is timed according to the newly-received eDRX timer value. During intermittent periods within the idle period 522, data may be received, such as at block 524.

Example Methods

Figure 6:
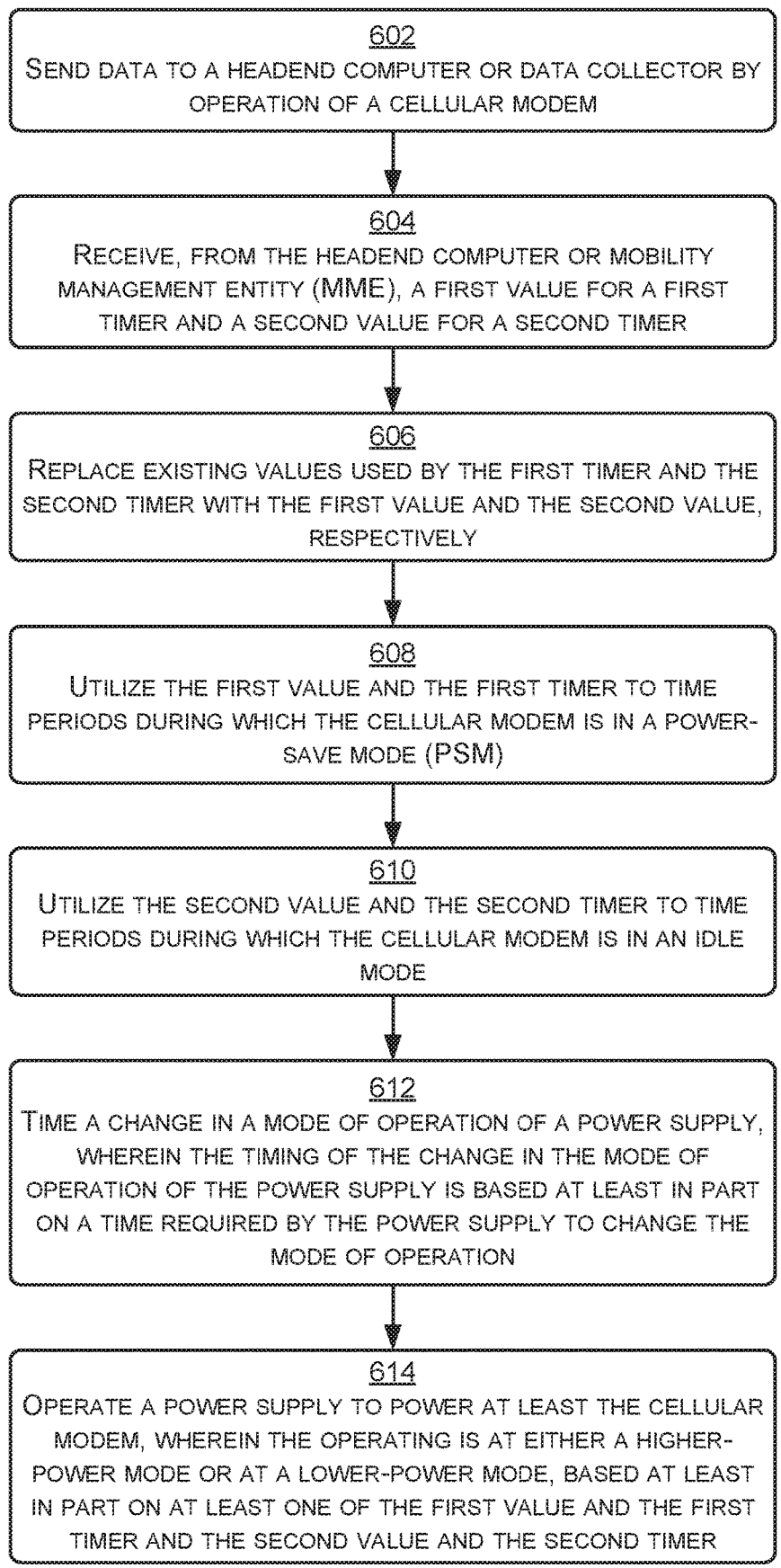
FIG. 6 shows an example method by which a battery-powered device may be operated in a networked environment.
Figure 7:
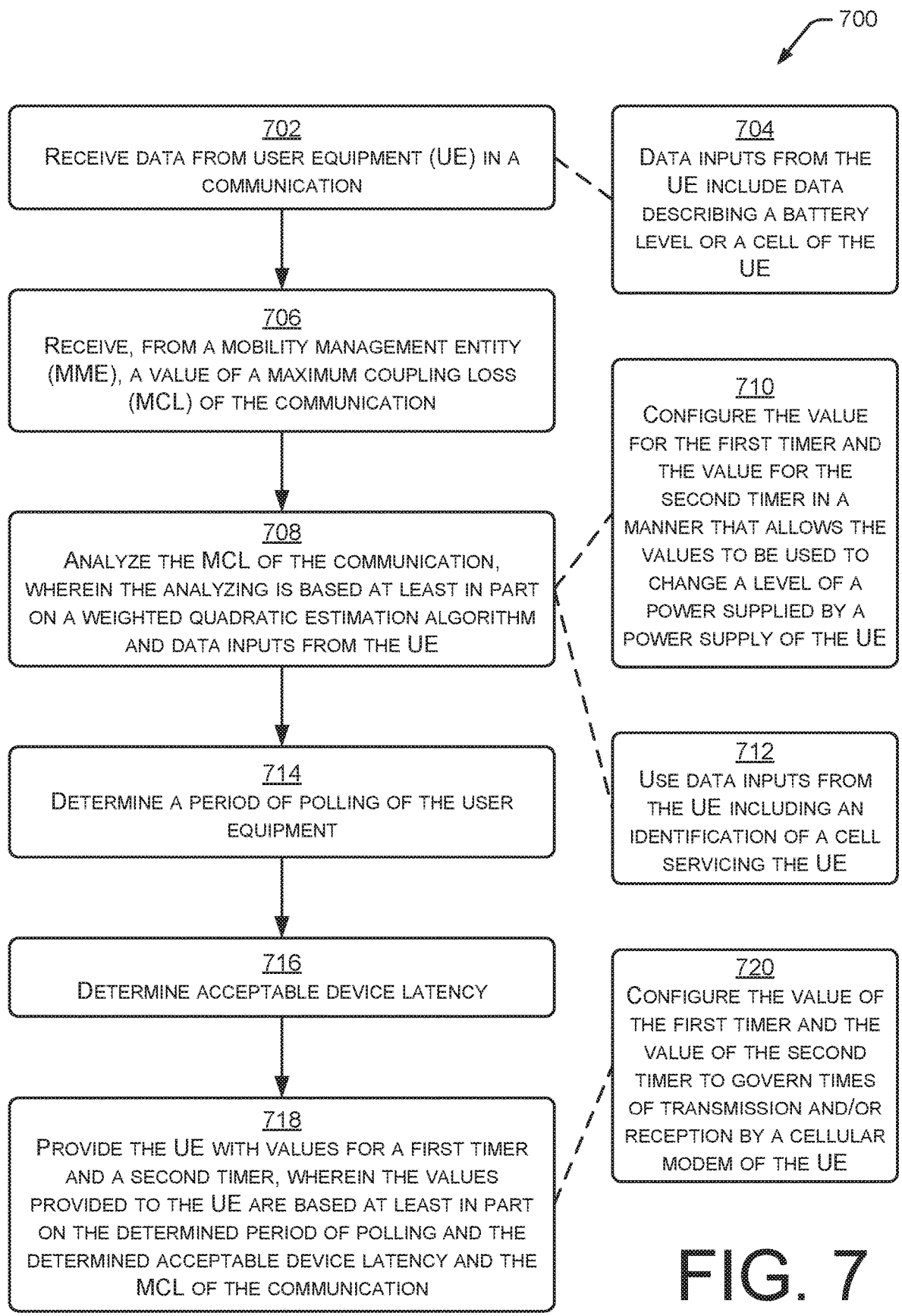
FIG. 7 shows an example method by which a headend device may be operated in a networked environment.

FIGS. 6-7 are flowcharts showing example methods and operation of cellular networks including low-powered or battery-powered user devices, metering devices and/or elements of the internet of things. The methods and operation may be performed and/or directed by any desired processor (e.g., processor 210 of FIG. 2, or headend computing device 120 of FIGS. 1 and 2, memory 212, integrated circuit, logic devices, programming, etc. However, the methods of FIGS. 6 and 7 contain general applicability and are not limited by other drawing figures and/or prior discussion. The functional blocks of FIGS. 1-5 may be implemented by software and/or hardware structures or devices that are configured to operate a device or tool for use in a cellular network having battery-powered device. While functional blocks and device are shown to provide an operable example, such blocks and devices and their described functionality can be shared, mixed, or redistributed among the same or other blocks and other devices in other examples.

In some examples of the techniques discusses herein, the methods of operation may be performed by one or more application specific integrated circuits (ASIC) or may be performed by a general-purpose processor utilizing software defined in computer readable media. In the examples and techniques discussed herein, the memory 212 or memory within headend 120 may comprise computer-readable media and may take the form of volatile memory, such as random-access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

FIG. 6 shows an example method 600 by which a battery-powered device may be operated in a networked environment. In the example, communication between a cellular tower and a battery-powered device results in generation of data, both calculated and measured, at the cellular MME and/or headend computer. This data, such as the maximum coupling loss (MCL), may be used (e.g., by the headend computer), to generate replacement values for timers used by the battery-powered device. Using the new timer values, the battery-powered device is able to idle, sleep (power save mode, PSM), receive RF signals, and transmit RF signals, at more appropriate times, and for more appropriate periods of time, and to thereby conserve battery power. Additionally, the timers may be used to control other devices, such as the power supply regulating the unregulated battery power of the device, and in some cases, processors and memory devices in a device containing the cellular modem. Accordingly, data from the headend and/or cellular MME is used to extend battery life of devices on a cellular network.

At block 602, data is sent from a battery-powered cellular device to a headend computer and/or data collector by operation of a cellular modem. The data may be sent by a cellular modem to a cell tower, and from the tower through one or more networks, such as the internet, to the headend computer. The headend computer may be any computing device, data collector, etc., that is remote from the battery-powered cellular device. In an example, the data may be consumption or metrology data from a gas or water metering device of a utility company. In another example, the data may be location data of a product item in a warehouse, store or person's residence. In another example, the data may be associated with any IoT object.

At block 604, a first value for a first timer and a second value for a second timer is received at the battery-powered device from the headend computer or mobility management entity (MME). The values for the timers regulate how long the timed period will be, for each timer. The first and second values may regulate a duration and timing of RF transmit, RF receive, power save mode and/or idle periods of the cellular modem. Careful selection of these timer values by the headend, based on factors such as the MCL, may extend battery life. PSM, from which a subsequent bootup may be required, and idle mode, from which the cellular modem may more quickly respond, may be used to save battery power.

At block 606, existing values used by the first timer and the second timer are replaced with the first value and the second value, respectively. The timers may have default values and/or initially programmed values. These values may be replaced in a permanent or temporary manner.

At block 608, the first value and the first timer are utilized to time periods during which the cellular modem is in a power-save mode (PSM). A timer such as the T3412 timer may be used to time a PSM. Accordingly, at expiration of the timer, the PSM ends, and the cellular modem of the battery-powered device is rebooted.

At block 610, the second value and the second timer are utilized to time periods during which the cellular modem is in an idle mode. The idle mode uses more power than the PSM, but allows for more rapid translation to an RF receiver mode. A timer such as the T3324 may be used to time the idle periods. Accordingly, the T3324 translates the cellular modem between idle and RF reception according to a time that was calculated by the headend, based on design requirements or power-management calculations.

At block 612, a change in a mode of operation of a power supply (or regulator) may be timed. Additionally or alternatively, a change in the power regulator/supply that is used may be timed. One or both of the first and second timers may be used to transition the power supply (which may regulate current and/or voltage from the batteries) from a lower-power state to a medium-powered or higher-powered state. In an example, the timing of the change in the mode of operation of the power supply may be based at least in part on a time required by the power supply to change the mode of operation. Thus, a timer(s) may use a value(s) based on, but not equal to, the timer value(s) used to operate the cellular modem, if the power supply requires a different period of time to become operational in a changed mode. In a second example, the timer(s) may be used to control logic to swap in or out one power supply or regulator. In an example, one power regulator may be used for PSM and/or idle periods, and another power regulator used for RF reception and/or RF transmission. Accordingly, output from a timer, put through appropriates logical gates or programming, could result in selection of the appropriate power supply/regulator.

At block 614, a power supply is operated to power at least the cellular modem and/or other integrated circuits or devices within the battery-powered device. The power supply may be operated at either a higher-power level, one or more medium-power levels, or at a lower-power level, based at least in part on at least one of the first value and the first timer and the second value and the second timer. Alternatively, a first power supply or a second power supply may be selected, based at least in part on at least one of the first value and the first timer and the second value and the second timer.

Alternatively or additionally, a change in a level of power supplied to the cellular modem may be timed. The change may be made by changing a mode of operation of a single power supply, or by changing between the use of two or more different power supplies. In the example, the timing of the change is based at least in part on at least one of the first timer and the second timer. The timer values may have to be changed somewhat from the values used to control the cellular modem, if the power supply mode change, or device change, requires a different period of time from the change in the operation of the modem.

In an example, the cellular modem may be operated in an extended discontinuous reception (eDRX) mode. The eDRX mode allows the battery-powered device to tell the network how many hyper frames (HF) it would like to sleep before checking back in. Accordingly, the number of HF provides an idling period for the cellular modem. During the idle period, the power supply may transition between a lower-power level and a higher-power level based at least in part on the timing and the number of hyper frames.

In an example, one or more of the timers (e.g., T3412 and T3324) may be operated on circuitry internal to a cellular modem. Alternatively, the timers may be discrete circuits, external to the modem. If the timers are internal to the modem, the timers may be used to control devices external to the cellular modem by allowing the timer(s) to control one or more a general-purpose input/output (GPIO) pin(s) of the cellular modem. In an example, a timer may use a GPIO to change a power level provided by the power supply/regulator, or to change a power supply/regulator used by the cellular modem. In the example, if the timer indicates the start of an RF transmission, the power supply may be notified of the need for appropriate power to power the transmitter. If the timer indicates the start of an RF reception, the power supply may be notified of the need for appropriate power to power the receiver. If the timer indicates the start of an RF sleep or idle period, the power supply may be notified of the need for appropriate power. This may involve changing a mode of the power supply and/or changing power supplies. By managing power supply selection and/or power supply mode of operation in a manner that reduces the loss inherent in providing regulated power. Appropriate use of appropriate timers, sometimes with timer output processed through logical devices and/or GPIO pin(s), can result in reduced power loss, while still providing adequate regulated power.

In an example, the timers are configured to control processes, such as RX transmission and power save mode, that are internal to the cellular modem. Additionally, the timers may be used, such as by passing signals out of the GPIO pins, to control devices external to the cellular modem. In an example, at least one of the first timer and the second timer may be used to control operation of the processor and the memory device that are external to the cellular modem. The timers may move the processor and/or memory devices between either a higher-power level or at a lower-power level. The power supply/regulator may also have to be adjusted or changed, to provide the required power.

In an example, the cellular modem may be within a gas or water metering device. A processor within the metering device may read consumption data from the memory device within the meter. The consumption data may have been created by a metrology unit of the metering device. Such data reads may be made in conjunction with RF transmissions of the data to the headend computer. The timing of the data-reads and the data-transmissions may be performed at time(s) based at least in part on one of the first timer and the second timer, which may be based in the cellular modem, and may be set by the headend based on conditions, such as the MCL.

In an example, an active period of a device, e.g., a device external to the cellular modem but within the battery-powered device, may be based at least in part on at least one of the first timer and the second timer. Such devices include power supplies/regulators, logic devices, processors, memory devices, etc.

In an example, after a power save mode, the headend computer or MME may be notified of availability of the battery-power device within a network. The notification may be made according to operation (e.g., at the expiration) of a timer. Accordingly, after a PSM period the device will notify the network of its continued availability and/or presence in the network. To provide power for the notification, the power supply may be activated, e.g., according to timing of the timer, to provide power to the cellular modem during the notification process following the PSM period. Advantageously, the power supply consumes less power prior to being called upon to power the RF transmitter.

Similarly, a period of time during which, or at which, the cellular modem is reachable by the headend computer or MME may be determined. The period of time may be indicated according to operation of the second timer (e.g., the T3324 timer). The timer may also be used to active a power supply, to provide power to the cellular modem during the time during which the cellular modem is scheduled to be reachable. In an example, the T3324 signals both the RF transmitter and also a GPIO pin, which wakes the power supply in a just-in-time manner, to power the RF transmitter. The T3324 signal may be bifurcated, with one signal delayed to signal one or the other of the power supply and the RF transmitter, depending on the respective startup times of these devices. Accordingly, battery power use is lessened.

In an example, the cellular modem is operated in an extended discontinuous reception (eDRX) mode. According to the mode the cellular modem is idled according to a predetermined number of hyper frames (HF), which may have been set by the headend computer. The number of HF may be set based on the MCL of communications made by the cellular modem and/or design requirements and constraints. The operation of the power supply may be controlled and timed, between a lower-power level or a higher-power level, based at least in part on the number and timing of the hyper frames.

In an example, consumption data may be accessed from a memory device of the battery-powered device at a time based at least in part on one of the first timer and the second timer. Thus, the timers regulate power save mode and idle mode within the cellular modem of the battery-powered device. Additionally, the timers may regulate the functionality of devices outside the cellular modem, such as by sending signals from the GPIO pins of the cellular modem. The power supply, processor, memory devices and other devices, external to the cellular modem, may also be turned on and off according to timing based on timers, including the first timer and the second timer and/or the T3412 timer and the T3324 timer.

FIG. 7 shows an example method 700 by which a headend device may be operated in a networked environment, and by which the headend device may configure timers, hyper frame values, and other data to assist user equipment or network endpoints to conserve battery power. In the example, communication between a cellular tower and a battery-powered device (e.g., UE or endpoint) results in generation of data, both calculated and measured, at the cellular MME. This data, such as the maximum coupling loss (MCL) used by the headend or other computing device, to generate replacement values for timers used by the battery-powered device. The new timer values may be configured by the headend so that the battery-powered device is able to idle and sleep for appropriate periods of time, and to thereby conserve battery-power. Additionally, the timers may be configured by the headend to assist the UE to control other devices, such as the power supply regulating the unregulated battery power of the device, and in some cases, processors and memory devices in a device containing the cellular modem. Accordingly, the data from the headend and/or cellular MME, is used to extend battery life of devices on a cellular network.

At block 702, data (e.g., from user equipment (UE)) may be received by a headend in a communication that was at least in part, over a cellular network. The data may include consumption or metrology data is the UE is an endpoint in a utility company's network. The data may include location information if the UE is associated with a product item. The data may include almost any information. At block 704, because the transmission was at least in part over a cellular network, additional data may be generated, such as an MCL value, a cellular tower associated with the UE, a battery level of the UE, etc. This data may be obtained by the MME and may be transferred to the headend or other computing device.

In an example, the value of the first timer and the value of the second timer may be used to govern or influence times of transmission and/or reception by a cellular modem of the UE. In the event of a transmission, a metering device (e.g., gas, electric or water meter) may transmit metrology data to the headend computer. Accordingly, the headend computer receives metrology data according to times based at least in part on operation of, and values used in, the first timer and the second timer. In the event of a reception, a metering device may receive a shut-off instruction from the headend computer, based at least in part on operation of, and values used in, the first timer and the second timer.

At block 706, a value of a maximum coupling loss (MCL) of the communication and other data may be received at the headend, in a transmission from a mobility management entity (MME). The other data may include the data generated at blocks 702 and 704.

At block 708, the MCL and/or other data obtained from or during the communication of block 702 may be analyzed. The analysis may be based at least in part on an algorithm, as indicated by the system design. In an example, a weighted quadratic estimation algorithm may be used, and may include data inputs from the UE, such as battery level, cellular tower, etc. In the example of block 710, the value for the first timer and the value for the second timer may be configured by the headend, MME or other computing device in a manner that allows the values to be used by the UE to change a level of a power supplied by a power supply of the UE, and to operate processors, memory devices and/or other device within the UE. In the example of block 712, data inputs from the UE may be used, including an identification of a cell servicing the UE, a battery level of the UE, or other information.

At blocks 714, a period for polling the UE is determined. The period of device polling may be based at least in part on system design requirements.

At blocks 716, a latency, or latency in response, of the UE is determined or set. The period of acceptable device latency may be based at least in part on system design requirements.

At block 718, the headend device provides the UE with values for a first timer and a second timer. The timer values provided to the UE are based at least in part on one or more of the determined period of polling, the determined acceptable device latency, and the MCL of the communication. In the example of block 720, the value of the first timer and the value of the second timer are configured to govern times of transmission and/or reception, of idle mode, power save mode, and/or other functions performed by a cellular modem and other devices within the UE.

In an example, providing the UE with the values for the first timer and the second timer, includes: providing a value for the first timer that directs a cellular modem of the UE when to enter and when to exit a power-save mode (PSM); and providing a value for the second timer that directs the cellular modem of the UE when to enter and when to exit an idle mode. The headend may also provide the UE with adjusted timer values, that are based at least in part on one or both of the first and second timers, for use in operating devices of the UE, other than the cellular modem. The adjusted values may time slightly longer or shorter periods, but be based at least in part on the first and second values. The adjusted timer values may be used for use in changing modes in a single power supply, or changing between two power supplies, as indicated by the changes in activity of the cellular modem. The adjusted values may be used in the same or different timers, so that appropriate signals are generated to transition the cellular modem between modes of operation and to transition the UE to appropriate power levels for that activity.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:
1. A battery-powered device, comprising:
a cellular modem;
a processor, in communication with the cellular modem;
a memory device, in communication with the processor;
instructions, stored in the memory device, which when executed by the processor configure the battery-powered device to perform actions comprising:
sending data to a headend computer or data collector in a communication;
receiving, from the headend computer or a mobility management entity (MME), a first value for a first timer and a second value for a second timer, wherein the first value and the second value are based at least in part on an analysis by the headend computer, the analysis based at least in part on inputs comprising: a value of a maximum coupling loss (MCL) of the communication;
replacing existing values of the first timer and the second timer with the first value and the second value, respectively;
utilizing the first value and the first timer to time periods during which the cellular modem is in a power-save mode (PSM);
utilizing the second value and the second timer to time periods during which the cellular modem is in an idle mode; and
operating a power supply to power at least the cellular modem, wherein the operating is at either a higher-power level or at a lower-power level, based at least in part on at least one of the first value and the first timer and the second value and the second timer.

2. The battery-powered device of claim 1, wherein the performed actions additionally comprise:
operating the cellular modem in an extended discontinuous reception (eDRX) mode;
idling the cellular modem according to a number of hyper frames; and
operating the power supply in the lower-power level or the higher-power level based at least in part on the number of hyper frames.

3. The battery-powered device of claim 1, wherein the performed actions additionally comprise:
responsive to at least one of the first timer and the second timer, providing a signal on a general-purpose input/output (GPIO) pin of the cellular modem to change a power level provided by the power supply.

4. The battery-powered device of claim 1, wherein the performed actions additionally comprise:
responsive to at least one of the first timer and the second timer, operating the processor and the memory device at either a higher-power level or at a lower-power level.

5. The battery-powered device of claim 1, wherein the performed actions additionally comprise:
reading consumption data from the memory device of the battery-powered device, wherein the consumption data was created by a metrology unit, and wherein the reading was performed at a time based at least in part on one of the first timer and the second timer.

6. The battery-powered device of claim 1, wherein the performed actions additionally comprise:
basing an active period of a device, the device external to the cellular modem but within the battery-powered device, at least at least in part on at least one of the first timer and the second timer.

7. The battery-powered device of claim 1, wherein the performed actions additionally comprise:
notifying the headend computer or MME of availability of the battery-power device within a network according to operation of the first timer;
activating the power supply, according to timing of the first timer, to provide power to the cellular modem during the notification;
determining a period of time during which the cellular modem remains reachable by the headend computer or MME during an idle mode according to operation of the second timer; and
activating the power supply, according to timing of the second timer, to provide power to the cellular modem during the determined period of time.

8. A method of operating a battery-powered device, comprising:
sending data in a communication to a headend computer or remote computing device by operation of a cellular modem;
receiving a first value for a first timer and a second value for a second timer, wherein the first value and the second value are based at least in part on an analysis by the headend computer, the analysis based at least in part on inputs comprising:
a period of polling of the battery-powered device;
an acceptable device latency of the battery-powered device; and
a value of a maximum coupling loss (MCL) of the communication;
replacing existing values used by the first timer and the second timer with the first value and the second value, respectively;
utilizing the first timer to time periods during which the cellular modem is in a power-save mode (PSM);
utilizing the second timer to time periods during which the cellular modem is in an idle mode;
timing a change in a level of power supplied to the cellular modem, wherein the timing of the change is based at least in part on at least one of the first timer and the second timer; and
providing power to the cellular modem according to the timed change.

9. The method of operating the battery-powered device of claim 8, additionally comprising:
responsive to at least one of the first timer and the second timer, operating a processor and a memory device at either a higher-power level or at a lower-power level.

10. The method of operating the battery-powered device of claim 8, additionally comprising:
operating the cellular modem in an extended discontinuous reception (eDRX) mode;
idling the cellular modem according to a number of hyper frames (HF); and
operating a power supply in a lower-power level or a higher-power level based at least in part on the number of HF.

11. The method of operating the battery-powered device of claim 8, additionally comprising:
accessing consumption data from a memory device of the battery-powered device at a time based at least in part on one of the first timer and the second timer.

12. The method of operating the battery-powered device of claim 8, additionally comprising:
outputting a signal based on at least one of the first timer and the second timer on a general-purpose input/output (GPIO) pin of the cellular modem; and
activating a device, the device external to the cellular modem but within the battery-powered device, with the signal on the GPIO pin.

13. The method of operating the battery-powered device of claim 8, wherein sending data to the remote computing device or headend computer comprises:
sending metrology data to the remote computing device or headend computer.

14. The method of operating the battery-powered device of claim 8, additionally comprising:
notifying the remote computing device or MME of availability of the battery-power device within a network according to operation of the first timer;
activating a power supply, according to timing of the first timer, to provide power to the cellular modem during the notification;
determining a period of time during which the cellular modem remains reachable by the remote computing device or MME during an idle mode according to operation of the second timer; and
activating a power supply, according to timing of the second timer, to provide power to the cellular modem during the determined period of time.

15. A method of operating a headend computer, comprising:
under control of one or more processors configured with executable instructions:
receiving data from user equipment (UE) in a communication;
receiving, from a mobility management entity (MME), a value of a maximum coupling loss (MCL) of the communication;

analyzing the MCL of the communication, wherein the analyzing is based at least in part on data inputs from the UE, wherein the analyzing comprises:
   determining a period of polling of the user equipment; and
   determining acceptable device latency; and
providing the UE with values for:
   a first timer; and
   a second timer;
wherein the values provided to the UE are based at least in part on the determined period of polling and the determined acceptable device latency, and the MCL of the communication.

16. The method of claim 15, wherein the determined period of polling and the determined acceptable device latency are based at least in part on system design requirements.

17. The method of claim 15, wherein providing the UE with the values for the first timer and the second timer, comprises:
   providing a value for the first timer that directs a cellular modem of the UE when to enter and when to exit a power-save mode (PSM); and
   providing a value for the second timer that directs the cellular modem of the UE when to enter and when to exit an idle mode.

18. The method of claim 15, additionally comprising:
configuring the value for the first timer and the value for the second timer in a manner that allows the values to be used to change a level of a power supplied by a power supply of the UE; and
wherein the data inputs from the UE comprise at least an identification of a cell servicing the UE.

19. The method of claim 15, wherein:
the value of the first timer and the value of the second timer govern aspects of times of transmission and/or reception by a cellular modem of the UE; and
the headend computer receives metrology data according to times based at least in part on operation of the first timer and the second timer.

20. The method of claim 15, wherein data inputs from the UE comprise data describing a battery level of the UE.

* * * * *